United States Patent Office 3,463,427
Patented Aug. 26, 1969

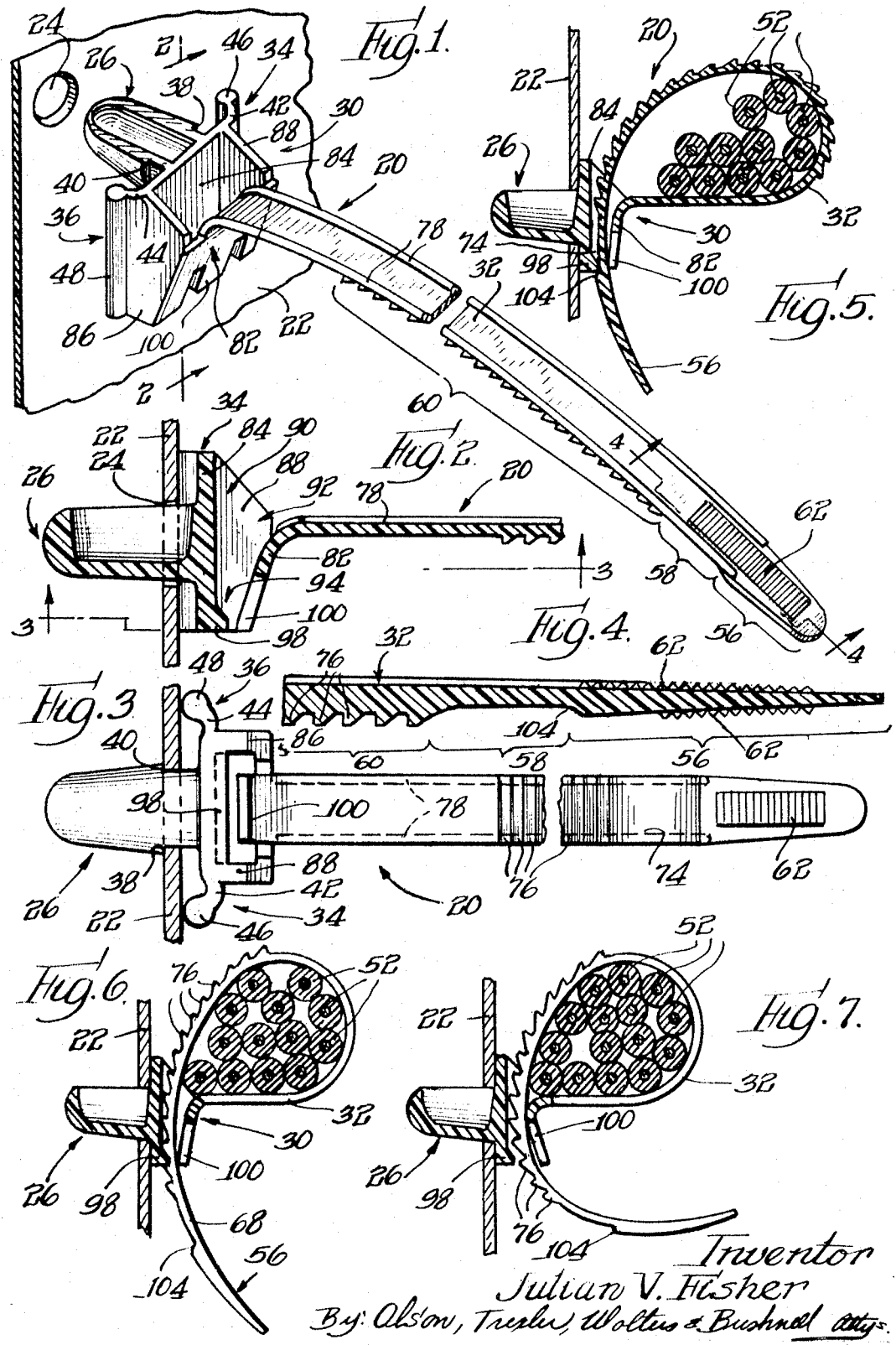

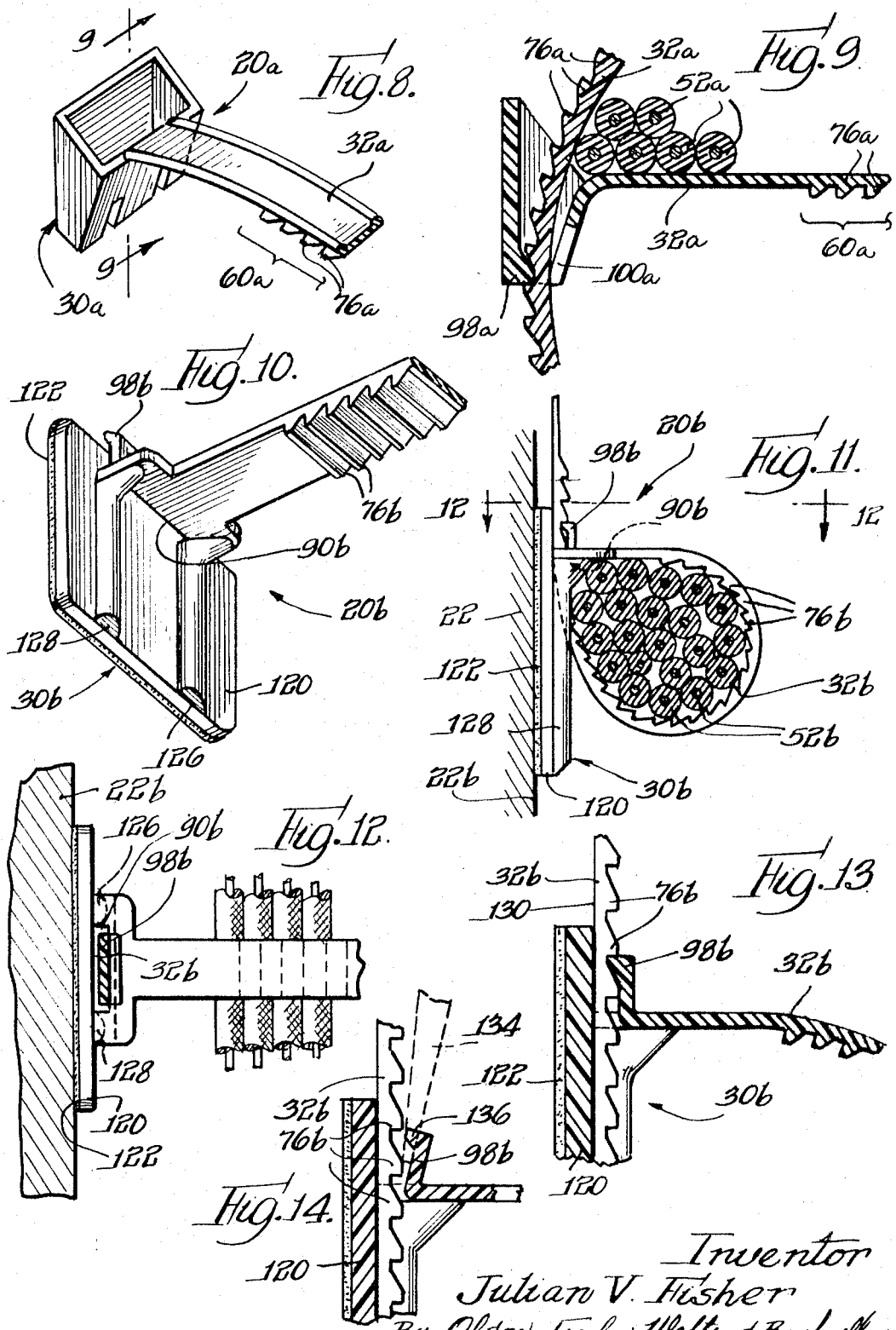

3,463,427
CABLE STRAP
Julian V. Fisher, Carpentersville, Ill., assignor to Illinois Tool Works Inc., Chicago, Ill., a corporation of Delaware
Filed Aug. 7, 1967, Ser. No. 658,772
Int. Cl. F16l 3/22
U.S. Cl. 248—68     16 Claims

ABSTRACT OF THE DISCLOSURE

This invention relates generally to a clamp assembly for encompassing a group or bundle of wires or cables. More specifically, this invention relates to an integrally formed cable strap including a body section having a latch tooth and a flexible strap section which extends from and is received in the body section to position one tooth of a plurality of teeth on the strap section for locking engagement with the latch tooth.

---

Clamp assemblies are commonly used to retain cables and wires in groups in automobiles, electric appliances and other devices. It is an object of the present invention to provide a relatively inexpensive clamp assembly with improved locking effectiveness for holding wires and cables.

Another object of this invention is to provide a cable strap including a body section and a strap section which is readily positioned in locking engagement with the body section.

Another object of the invention is to provide a cable strap which can be readily moved between an open position, an intermediate position in which the cables and wires are loosely retained during assembly, and a final or binding position.

Another object of this invention is to provide a cable strap which can be readily mounted in fixed engagement with a support panel or member.

These and other objects and features of the invention will become more apparent upon a reading of the following detailed description taken in connection with the accompanying drawings wherein:

FIG. 1 is a perspective view illustrating a clamp assembly, forming a first embodiment of the invention in detached association with a mounting panel and in an open position for receiving a bundle of wires or cables;

FIG. 2 is a fragmentary sectional view, taken along the line 2—2 of FIG. 1, illustrating the engagement of the attaching section or extremity of the clamp assembly with the mounting panel;

FIG. 3 is a plan view, taken along the line 3—3 of FIG. 2, further illustrating the structure of the clamp assembly and its relationship to the panel;

FIG. 4 is an enlarged fragmentary sectional view, taken along the line 4—4 of FIG. 1, illustrating the structure of the free extremity of the clamping assembly strap;

FIG. 5 is a sectional view, illustrating the clamp assembly in a first position wherein a plurality of cables are loosely encircled by the strap section;

FIG. 6 is a sectional view, similar to FIG. 5, illustrating the clamp assembly strap in a second position wherein the cables or wires are pressed and firmly clamped together by the strap;

FIG. 7 is a sectional view, similar to FIG. 6, illustrating the strap section in a release position to enable it to be moved to the loose assembly position of FIG. 5 and the open position of FIG. 1.

FIG. 8 is an enlarged fragmentary sectional view of a clamp assembly forming a second embodiment of the invention;

FIG. 9 is an enlarged fragmentary sectional view, taken along the line 9—9 of FIG. 8, illustrating the initial engagement of a strap section of the clamp assembly with a latch tooth;

FIG. 10 is an enlarged fragmentary perspective view of a clamp assembly forming a third embodiment of the invention;

FIG. 11 is an elevational view of the embodiment of the clamp assembly of FIG. 10 in a cable clamping position, similar to FIG. 6;

FIG. 12 is a top plan view, taken along the line 12—12 of FIG. 11;

FIG. 13 is an enlarged sectional view illustrating the engagement of a latch tooth of a body section of the clamp assembly of FIG. 11 with a tooth on a strap section of the clamp assembly to retain the clamp assembly in the binding position of FIG. 11; and FIG. 14 is an enlarged cross-sectional view, similar to FIG. 13, illustrating the latch tooth of the body section in strap release position.

Referring now to FIG. 1 of the drawings in greater detail, wherein like numerals have been employed to designate similar parts throughout the various figures, a cable strap or clamp assembly is designated generally by the numeral 20. The clamp 20 may advantageously be formed as an integral unit of nylon or similar plastic material. The clamp assembly 20 is shown in FIG. 1 in a detached association with respect to a mounting panel or support member 22 having an aperture 24 for receiving a shank or anchoring section 26 of the clamp assembly 20 for mounting the clamp assembly upon the mounting panel 22, as shown in FIGS. 2 and 3. The shank 26 extends outwardly from a rigid body or head section 30 of the clamp assembly while a flexible strap section 32 extends outwardly from the body section in the opposite direction. A pair of mounting flanges or wings designated generally by numerals 34 and 36 extend outwardly from the body section 30 for resilient engagement with the panel 22. The flanges 34 and 36 press against and yieldably cooperate with the mounting panel 22 to maintain shank shoulders 38 and 40 in locking engagement with the surface of the mounting panel 22 adjacent the aperture 24. The flanges 34 and 36 include a pair of opposite arcuate arms 42 and 44 enlarged at their free extremities to provide panel engaging feet 46 and 48. Thus the arrangement of the flanges 34 and 36 is such as to enable the shank section 26, upon telescopic association with the aperture 24, to secure the clamp assembly 20 in a fixed position upon the panel 22. The free extremity of a strap 32 may then be moved from the open position of FIG. 1 to a closed position in telescopic association with the body section 30, as shown in FIGS. 5 and 6.

The strap 32 includes an outer or free end portion 56, a smooth intermediate or preassembly portion 58, and a toothed or latching portion 60. The outer end portion 56 is tapered both in width and thickness, to facilitate initial insertion of the outer end portion 56 in the body section 30. Roughened surface areas 62 are formed on opposed sides of the end portion 56 of the strap 32 to expedite gripping thereof, either manually or by the use of a tool, such as a pair of pliers (not shown). The toothed section 60 includes a plurality of outwardly extending ratchet-like teeth 76. A plurality of longitudinally extending spaced apart parallel ribs or beads 78 are preferably formed on one side of the strap 32 and extend from the free end portion 56 of the strap to the body section 30, as is best seen in FIG. 1.

The body section 30 includes a front wall 82 and a rear wall 84 which are interconnected by a pair of parallel side walls 86 and 88. The front wall 82 slopes inwardly and downwardly toward the rear wall 84, FIG. 2, to form a generally funnel-shaped passage 90 having a relatively large mouth or open end section 92 and a relatively small restricted throat section 94. The throat section 94 is partially defined by a protuberance or locking tooth 98 on one side and a latch tap or tongue 100 on the opposite side.

The free end portion 56 of the flexible strap 32 may be inserted in the mouth 92 of the passage 90 to form a loop for encircling the wires or cables 52 (see FIG. 5). The end portion 56 is then pulled past the latch tooth 98 and tab 100 so that the outer end portion 56 extends outwardly from the body section 30 and the latch tooth 98 engages the smooth intermediate surface 74 to hold the strap 32 in an assembly or first closure position, as shown in FIG. 5. When the strap 32 is in this position the wires 52 are loosely encompassed thereby. A ramp which terminates in an abutment 104 interconnects a relatively thick portion of the strap portion 56 of the strap and the intermediate section 58 of the strap, as shown in FIG. 4. To permit authorized removal of the strap from the assembly or intermediate position as shown in FIG. 5 to the open position of FIGS. 1 through 3 it is only necessary to urge the exposed end of the strap laterally against the yieldable tab 100.

It should be noted in FIG. 5 that the tab 100 resiliently bears against the outer or beaded side of the strap so as to urge the ratchet-like teeth 76 into interlocking engagement with the protuberance 98. As the strap 32 is initially pulled downwardly through the throat 94, the latch member or tooth 98 eventually engages the shoulder or abutment 104. The shoulder 104 cooperates with the latch member 98 to secure the strap against unauthorized upward displacement. In this position the loop of the strap is sufficiently large so as to accommodate loosely the wires or cables 52, as shown in FIG. 5.

Once all of the cables to be secured have been positioned within the loop, the outer end portion 56 of the strap 32 may be grasped and pulled downwardly from the body section 30. The ratchet-like teeth 76 are moved into interlocking engagement with the latch member 98, as shown in FIG. 6, with the wires snugly held or clamped together. The pressure of the tab 100 against the strap maintains the teeth 76 in engagement with the latch tooth 98. When the strap is in the binding position, the ribs 78 of the strap 32 are pressed against the peripherally positioned cables thus serving more effectively to bind the cables or wires together as a unit. The tab 100 has a width, see FIG. 3, which is approximately the same as the spacing between the parallel ribs 78, so that the ribs guide the strap 32 as the strap is moved from the assembly position of FIG. 5 to the binding position of FIG. 6.

The teeth 76 can be moved out of engagement with the latch tooth 98, as shown in FIG. 7, by pulling the strap outwardly against the tab 100. The strap 32 may then be released and shifted longitudinally in the reverse direction from the binding position of FIG. 6 to the pre-assembly position of FIG. 5, and, of course, the open position of FIG. 1.

A second embodiment of the invention is shonw in FIGS. 8 and 9. The embodiment of the invention of FIGS. 8 and 9 is generally similar to the embodiment of the invention set forth in FIGS. 1 through 7. Therefore, components of a clamp assembly 20a of FIGS. 8 and 9 are designated with numerals corresponding to the numerals used to designate the components of the clamp assembly of FIGS. 1 through 7, with the suffix letter "a" being added. The clamp assembly 20a of FIG. 8 includes a generally funnel-shaped body section 30a and an outwardly extending flexible strap 32a. The strap 32a is formed in much the same manner as the strap 32 and includes an outer end portion, an intermediate or pre-assembly portion and a toothed or latching portion. The strap 32a has teeth 76a formed on the portion 60a for engagement with a protuberance or latch tooth 98a. The teeth 76a are retained in engagement with the latch tooth 98a by a resilient tab or tongue 100a. The clamp assembly 20a of FIGS. 8 and 9 differs from the clamp assembly 20 of FIGS. 1 through 7 in that the body section 30a does not include fastening means similar to the shank 26 and flanges 34 and 36. The clamp assembly 20a also is intended for use at locations wherein cables or wires 52a are to be bound together as a group which is not mounted upon a support panel.

A third embodiment of the invention is illustrated in FIGS. 10 through 14. The third embodiment of the invention contemplates a clamp assembly designated generally by the numeral 20b. Therefore, the components of the clamp assembly 20b of FIGS. 10 through 11 have been indicated with numerals similar to the numerals used to indicate the components of the clamp assembly of FIGS. 1 through 7 but bearing the suffix "b." The clamp assembly 20b includes a head section 30b having a flat base or mounting plate 120. The plate 120 is connected to a support member or panel 22b (see FIG. 11) by a layer 122 of pressure activated adhesive which is provided on the back surface of the base 120. A strap 32b extends outwardly from the body section 120 and includes a plurality of latch teeth 76b which engage a latch tooth 98b, as shown in FIGS. 11, 12 and 13.

From FIG. 11 it will be apparent that the strap 32b is looped downwardly and upwardly through a passage 90b formed by the body section 30b. The strap 32b clamps cables 52b as a unit or bundle upon the support panel 22b. The strap 32b includes an outer end portion, an intermediate or assembly portion and a toothed portion similar to the strap 32 of FIG. 1. The teeth 76b on the strap 32b are located along the inner surface of the strap surface as distinguished from the straps 32 and 32a. Protuberances or beads 126 and 128 (see FIG. 10) form a track or groove to guide the end portion of the strap 32b into the passage 90b. The latch tooth 98b, as can be seen in FIG. 13, is yieldably biased toward the strap 32b and thus maintains engagement of the free extremity 136 of the tooth member 98b with the strap teeth 76b. Resilient locking engagement of the member 98b with the ratchet-like teeth 76b of the strap 32b also urges the opposite surface of the strap against the adjacent surface of the plate 120.

In order to loosen the clamp assembly 20b, it is only necessary to pry the latch tooth 98b outwardly by the use of a suitable tool such as a screwdriver 134. This disengages the latch member from interlocking association with the strap teeth 76b thereby enabling the strap to be shifted longitudinally.

From the foregoing it will be readily understood that the present invention contemplates a cable clamp of extremely simple yet practical construction which may be produced by the use of conventional plastic molding equipment and methods. The novel disposition of the interlocking teeth and the simple manner in which the interlocked teeth may be disengaged to permit longitudinal shifting of the strap represents a distinct improvement over conventional cable clamps.

While particular embodiments of the invention have been shown, it should be understood, of course, that the invention is not limited thereto since many modifications may be made, and it is contemplated to cover by the appended claims any such modifications as fall within the true spirit and scope of the invention.

What is claimed is:

1. A one-piece clamp assembly for holding a plurality of elongated articles, such as electrical conductors, said clamp assembly including a body section having spaced walls defining a strap accommodating passage, a latch member associated with the wall of said body section defining a first side of said passage, a flexible strap extending outwardly from and laterally of the wall of said body section defining a second opposite side of said passage, said strap including a free end portion for initial telescopic association with said passage, shoulder means located adjacent to and inwardly from the free extremity of said strap, a plurality of teeth on said strap located intermediate the shoulder means and the body section, said strap being movable longitudinally from an open position with the end portion thereof disengaged from said body section to a first closed position extending through said passage with said latch member in engagement with said shoulder means to form a loop for loosely encircling a plurality of elongated articles and movable longitudinally between said first closed position and a second closed position with said latch member in engagement with at least one of said strap teeth to bind the encircled articles together as a unit, said latch member and said strap teeth being complementarily shaped to lock said strap against unauthorized longitudinal movement in reverse loosening direction, and pressure exerting tab means in the vicinity of said passage and forming a continuation of the aforesaid second side, said tab means being yieldable transversely of said passage and biased in one direction for maintaining said latch member and strap teeth interlocked and shiftable in the opposite direction for effecting clearance and consequent disengagement of said latch member and strap teeth, the aforesaid first side of said passage providing an abutment surface of substantial area for the side of the strap opposite the side engaged by the tab means.

2. An assembly as set forth in claim 1 wherein: the shoulder of said strap is positioned at one extremity of a ramp to facilitate unauthorized movement of said strap longitudinally from the first closed position to the open position.

3. An assembly as set forth in claim 1 wherein: said passage is provided with a relatively large mouth portion into which the outer end portion of said strap may be inserted initially to move said strap from the open position to an article encircling position, said latch member normally extending into the passage to define a restricted throat area.

4. An assembly as set forth in claim 3 wherein: the latch member comprises a tab connected to said body section in the vicinity of said throat area and laterally shiftable with respect to said throat area.

5. An assembly as set forth in claim 1 wherein: longitudinally extending spaced apart substantially parallel ribs are provided on a side of said strap opposite from the side on which the teeth are located for accommodating the tab means therebetween.

6. A clamp assembly as set forth in claim 1, wherein: the strap teeth are located along the side of the strap forming the external periphery thereof when in article encircling position.

7. A clamp assembly as set forth in claim 1, wherein: the strap teeth are located along the side of the strap forming the internal periphery thereof when in article encircling position.

8. A clamp assembly as set forth in claim 15, wherein: the latch member is located externally of the passage and is yieldably urged toward the strap by said pressure exerting tab means.

9. A clamp assembly as set forth in claim 1, wherein: the pressure exerting tab means is disposed oppositely from the latch member in the vicinity of the passage.

10. A clamp assembly as set forth in claim 9, wherein: the pressure exerting tab means engages the side of the strap oppositely disposed from the side of the strap with which the strap teeth are associated.

11. A clamp assembly as set forth in claim 10, wherein: said pressure exerting tab means may be shifted laterally as an incident to lateral movement of the strap to effect disengagement of the strap teeth from the latch member.

12. A clamp assembly as set forth in claim 1, wherein: a shank having work engaging shoulder means extends from the body section in a direction opposite from the strap for mounting the assembly in an apertured support such as a panel.

13. A clamp assembly as set forth in claim 12, including resilient work engaging flange means associated with the body section, and cooperatively disposed with respect to the shank shoulder means for urging said shoulder means axially into engagement with the apertured surface of a work piece such as a panel.

14. A clamp assembly as set forth in claim 1, wherein mounting means in the form of pressure sensitive adhesive is associated with a surface of said body section.

15. A one-piece clamp assembly for holding a plurality of elongated articles, such as electrical conductors, said clamp assembly including a body section having spaced walls defining a strap accommodating passage, a latch member associated with the wall of said body section defining a first side of said passage, a flexible strap extending outwardly from and laterally of the wall of said body section defining a second opposite side of said passage, said strap including a free end portion for initial telescopic association with said passage, a plurality of teeth on said strap, said strap being movable longitudinally from an open position with the end portion thereof disengaged from said body section to a closed position extending through said passage with said latch member in engagement with at least one of said strap teeth to bind the encircled articles together as a unit, said latch member and said strap teeth being complementarily shaped to lock said strap against unauthorized longitudinal movement in a reverse loosening direction, and a laterally yieldable pressure exerting tab member in the vicinity of said passage and yieldable transversely of the strap, said pressure exerting tab member being laterally biased in one direction for maintaining said latch member and strap teeth interlocked and laterally shiftable in the opposite direction to permit disengagement of said latch member and strap teeth, the aforesaid first side of said passage providing an abutment surface of substantial area for the side of the strap opposed to the side of the strap toward which the tab means is biased.

16. A clamp assembly as set forth in claim 15, wherein a shank having work-engaging shoulder means extends from the body section in a direction substantially normal to the strap for mounting the assembly in an apertured support such as a panel.

References Cited

UNITED STATES PATENTS

| | | | |
|---|---|---|---|
| 2,765,998 | 10/1956 | Engert | 248—205 X |
| 3,102,311 | 9/1963 | Martin | 248—74 X |
| 3,054,585 | 9/1962 | Roberts | 248—74 |
| 3,114,184 | 12/1963 | Bigaovette | 248—74 X |
| 3,154,281 | 10/1964 | Frank | 248—74 X |
| 2,632,217 | 3/1953 | Flora | 248—74 X |
| 3,214,808 | 11/1965 | Litwin | 248—74 X |
| 3,302,913 | 2/1967 | Collyer | 248—73 |

FOREIGN PATENTS

| | | |
|---|---|---|
| 233,324 | 4/1961 | Australia. |
| 1,005,269 | 9/1965 | Great Britain. |

CHANCELLOR E. HARRIS, Primary Examiner

U.S. Cl. X.R.

24—16; 248—71, 74